United States Patent
Cao

(10) Patent No.: US 8,096,694 B2
(45) Date of Patent: Jan. 17, 2012

(54) LIGHT GUIDING ASSEMBLY

(75) Inventor: Jin-Ti Cao, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 448 days.

(21) Appl. No.: 12/347,273

(22) Filed: Dec. 31, 2008

(65) Prior Publication Data

US 2010/0124056 A1    May 20, 2010

(30) Foreign Application Priority Data

Nov. 20, 2008 (CN) .......................... 2008 1 0305663

(51) Int. Cl.
 *F21V 7/04* (2006.01)
(52) U.S. Cl. .............. 362/607; 362/311.01; 362/311.06; 362/351; 362/616
(58) Field of Classification Search .......... 362/223–224, 362/290, 311.01, 311.03, 311.06, 351, 606–607, 362/615–616, 627–629
See application file for complete search history.

(56) References Cited

U.S. PATENT DOCUMENTS

| 7,246,932 B2 * | 7/2007 | Burtsev et al. ................ 362/616 |
| 2002/0034071 A1 * | 3/2002 | Mabuchi .......................... 362/31 |
| 2008/0101083 A1 * | 5/2008 | Lee et al. ....................... 362/610 |

FOREIGN PATENT DOCUMENTS

CN    1896836 A    1/2007

* cited by examiner

*Primary Examiner* — Stephen F Husar
*Assistant Examiner* — Meghan Dunwiddie
(74) *Attorney, Agent, or Firm* — Altis Law Group, Inc.

(57) ABSTRACT

A light guiding assembly is provided. The light guiding assembly includes a first light guiding plate, a second light guiding plate, and a shielding plate. The second light guiding plate is located adjacent to the first light guiding plate. The shielding plate is positioned between the first light guiding plate and the second light guiding plate, to prevent light guided by the first light guiding plate and light guided by the second light guiding plate from mixing.

20 Claims, 3 Drawing Sheets

LIGHT GUIDING ASSEMBLY

BACKGROUND

1. Technical Field

The present invention relates to light guiding assemblies and, particularly to a light guiding assembly used in portable electronic devices.

2. Description of Related Art

Portable electronic devices usually include keypads for inputting information. When operating such portable electronic devices in the dark, keys of the keypads often need to be illuminated to be seen and operated by users. Each key can be illuminated by a light source corresponding to the key. However, this type of keypad is expensive since many light sources are required.

A typical way to reduce the number of light sources is to use a light guiding assembly. To improve the external appearance and quality of the portable electronic device, the light guiding assembly may include a number of light guiding plates, thereby making the keypad of the portable electronic device illuminating different color light corresponding to the color of the light guiding plate. For example, referring to FIG. 3, a typical light guiding assembly 1 includes a first light guiding plate 2 with one color and a second light guiding plate 3 with another color different from the color of the first light guiding plate 2. The first light guiding plate 2 is integrated with the second light guiding plate 3, so an interface 4 is formed between the first light guiding plate 2 and the second light guiding plate 3. However, when using the light guiding assembly 1, different color light may be mixed in the interface 4 to affect the illuminating quality of the keypad.

Therefore, there is room for improvement within the art.

BRIEF DESCRIPTION OF THE DRAWINGS

Many aspects of a light guiding assembly can be better understood with reference to the following drawings. These drawings are not necessarily drawn to scale, the emphasis instead being placed upon clearly illustrating the principles of the exemplary light guiding assembly. Moreover, in the drawings like reference numerals designate corresponding parts throughout the several views. Wherever possible, the same reference numbers are used throughout the drawings to refer to the same or like elements of an embodiment.

DETAILED DESCRIPTION OF THE EXEMPLARY EMBODIMENTS

Embodiments will now be described in detail below and with reference to the drawings. The light guiding assembly can be applied to an electronic device, for example, a mobile phone.

Figure 1:
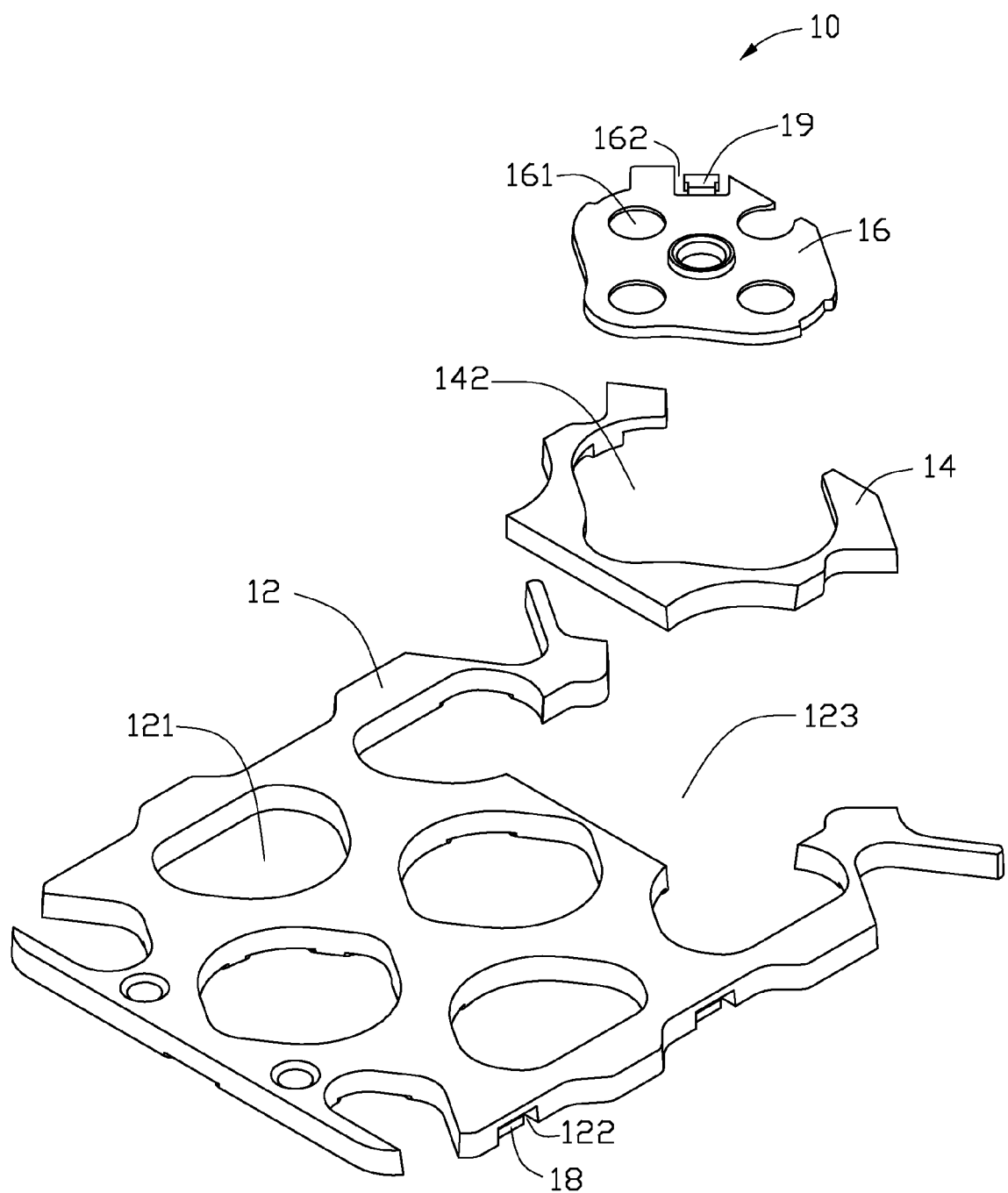
FIG. 1 is an isometric and exploded schematic view of a light guiding assembly in accordance with an exemplary embodiment.
Figure 2:
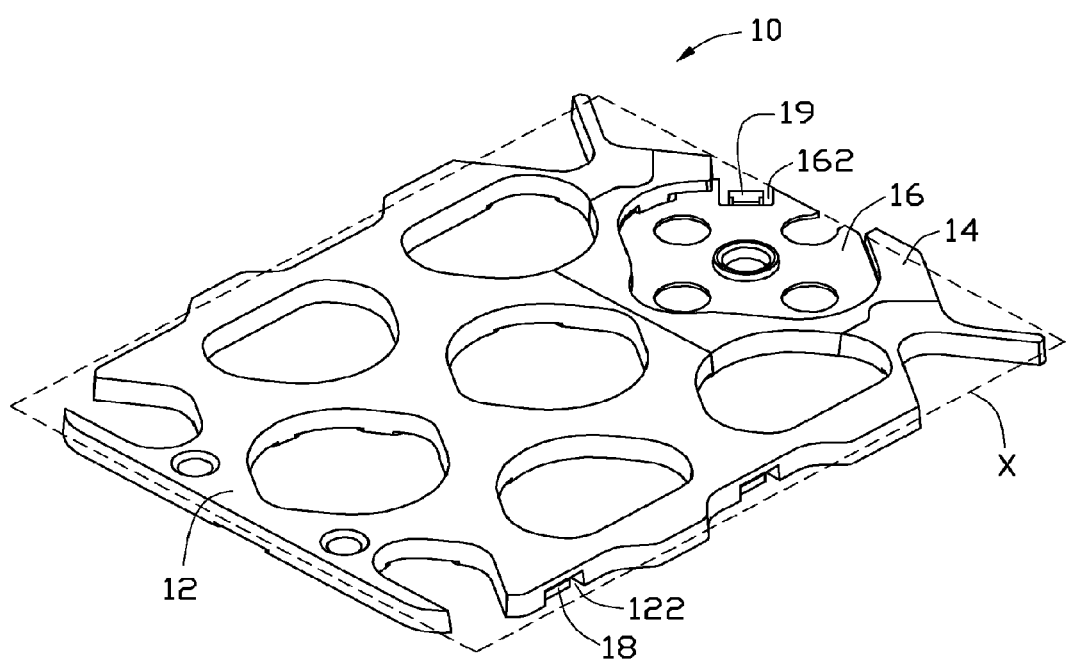
FIG. 2 is an assembled view of the light guiding assembly 1 shown in FIG.1.
Figure 3:
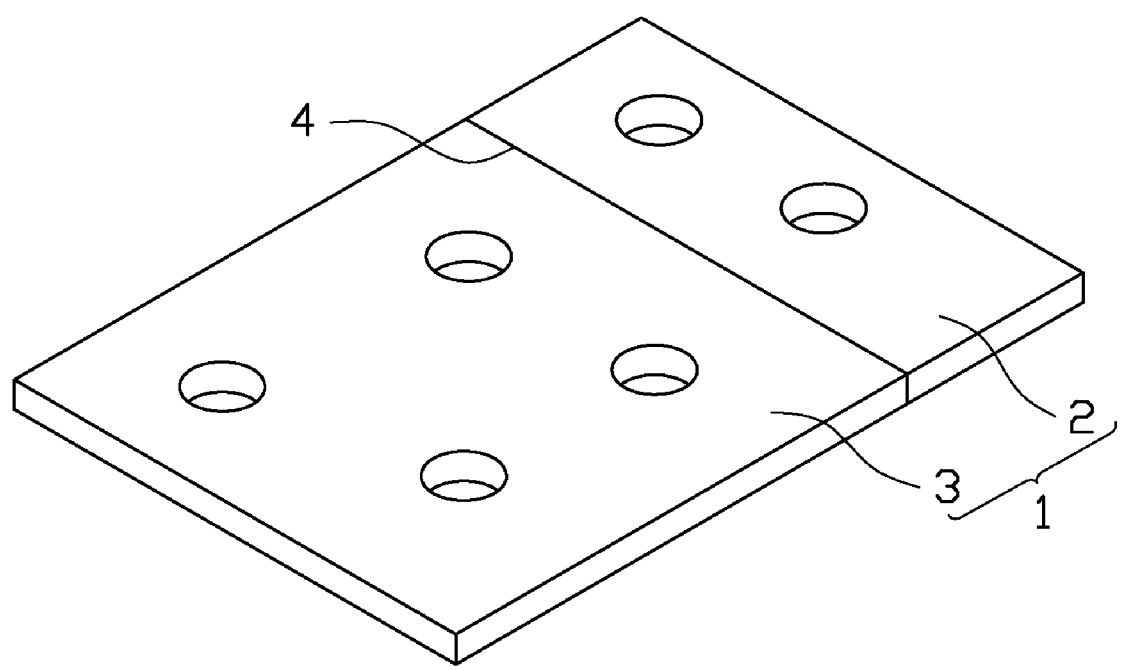
FIG. 3 is an assembled view of a typical light guiding assembly.

FIG. 1 and FIG. 2 show a light guiding assembly 10. The light guiding assembly 10 includes a first light guiding plate 12, a shielding plate 14, a second light guiding plate 16 located adjacent the first light guiding plate 12. In this exemplary embodiment, the first light guiding plate 12 and the second light guiding plate 16 are substantially lying in a same plane X shown in FIG. 2. A plurality of first light sources 18 and a plurality of second light sources 19 provide light to the light guiding plates. The color of the first light guiding plate 12 can be different from the color of the second light guiding plate 16. For example, the color of the first light guiding plate 12 can be red, and the color of the second light guiding plate 16 can be green. The shielding plate 14 separates light guided by the first light guiding plate 12 and light guiding by the second light guiding plate 16 to prevent them from mixing.

The first light guiding plate 12 is substantially rectangular, and defines a plurality of first holes 121, a plurality of first cutouts 122, and a notch 123 therethrough. The first holes 121 correspond to and accommodate keys of a keypad assembly (not shown). The first cutouts 122 correspond to and accommodate the first light sources 18. The notch 123 corresponds to and accommodates the shielding plate 14. The first light guiding plate 12 can be made of one or more materials selected from a group consisting of polyvinyl chloride (PVC), polycarbonate, polystyrene, and any other thermoplastic resins.

The shielding plate 14 has the same shape and size as the notch 123 of the first light guiding plate 12. The shielding plate 14 is accommodated and fixed in the notch 123. The shielding plate 14 and the first light guiding plate 12 can be integrally formed together by such means as integrally molded or adhered. The shielding plate 14 defines an opening 142 at a central area thereof. The opening 142 should correspond to and accommodate the second light guiding plate 16.

The shielding plate 14 can be made of an opaque material with a black color (e.g., the compound of resin and carbon), to prevent light of the first light guiding plate 12 from transmitting to the second light guiding plate 16. The shielding plate 14 can also prevent light of second light guiding plate 16 from transmitting to the first light guiding plate 12. Thus the shielding plate 14 can prevent the light of the first light guiding plate 12 and the light of the second light guiding plate 16 mixing together, which improve the illuminating quality of light guiding assembly 10.

The second light guiding plate 16 defines a plurality of second holes 161 and a plurality of second cutouts 162 therethrough. The second holes 161 should correspond to and accommodate another keys of the keypad assembly. The second cutouts 162 should correspond to and accommodate the second light sources 19.

The second light guiding plate 16 has the same shape and size as the opening 142 of the shielding plate 14. The second light guiding plate 16 is accommodated and fixed in the opening 142, and integrally formed with the shielding plate 14. Thus, the shielding plate 14 is positioned between the first light guiding plate 12 and the second light guiding plate 16. The second light guiding plate 16 and the shielding plate 14 can be integrally formed together by such means as integrally molded or adhered.

The first light sources 18 and the second light sources 19 may be light emitting diodes (LEDs). When the first light sources 18 and the second light sources 19 are placed within the light guiding assembly 10, light generated by the first light sources 18 and the second light sources 19 can be guided to illuminate keys of a keypad assembly (not shown).

It is understood that the first light guiding plate 12 and the second light guiding plate 14 may be located adjacent to each other and defines a space therebetween. The shielding plate 16 may be embedded/inserted in the space between the first light guiding plate 12 and the second light guiding plate 14 such that light guided by the first light guiding plate 12 and light guided by the second light guiding plate 14 cannot mixed together.

An advantage of the exemplary embodiment is as follows. The shielding plate 14 is position between the first light guiding plate 12 and the second light guiding plate 16, so the shielding plate 14 may separate light guided by the first light guiding plate 12 and light guiding by the second light guiding plate 16. Thus, the light guiding assembly can prevent color mixing in an interface between the first light guiding plate 12 and the second light guiding plate 16, thus improve the illuminating quality of the keypad.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A light guiding assembly, comprising:
   a first light guiding plate;
   a second light guiding plate, the second light guiding plate and the first light guiding plate being substantially coplanar with each other; and
   a shielding plate positioned between the first light guiding plate and the second light guiding plate, to prevent light guided by the first light guiding plate and light guided by the second light guiding plate from mixing.

2. The light guiding assembly as claimed in claim 1, wherein the shielding plate, the first light guiding plate, and the second light guiding plate are integrally formed together.

3. The light guiding assembly as claimed in claim 2, wherein the shielding plate, the first light guiding plate, and the second light guiding plate are integrally molded together.

4. The light guiding assembly as claimed in claim 2, wherein the shielding plate, the first light guiding plate, and the second light guiding plate are integrally adhered together.

5. The light guiding assembly as claimed in claim 1, wherein the first light guiding plate and the second light guiding plate are made of one or more thermoplastic resins selected from a group consisting of polyvinyl chloride polycarbonate and polystyrene.

6. The light guiding assembly as claimed in claim 1, wherein the shielding plate is made of an opaque material.

7. The light guiding assembly as claimed in claim 6, wherein the opaque material is a mixture of a resin and carbon black.

8. The light guiding assembly as claimed in claim 1,wherein the first light guiding plate defines a notch therethrough, the shape of the shielding plate corresponds to the shape of the notch and is received in the notch.

9. The light guiding assembly as claimed in claim 8, wherein the shielding plate defines an opening at a central area thereof, the second light guiding plate has the same shape and size as the opening and is accommodated and fixed in the opening such that shielding plate is positioned between the first light guiding plate and the second light guiding plate.

10. The light guiding assembly as claimed in claim 8, wherein the light guiding assembly further comprises first light sources and the first light guiding plate defines a plurality of first cutouts for accommodating the first light sources.

11. The light guiding assembly as claimed in claim 8, wherein the light guiding assembly further comprises second light sources and the second light guiding plate defines a plurality of second cutouts accommodating the second light sources therein.

12. The light guiding assembly as claimed in claim 8, wherein the first light guiding plate defines a plurality of first holes therethrough for accommodate keys therein.

13. The light guiding assembly as claimed in claim 8, wherein the first light guiding plate defines a plurality of second holes therethrough for accommodate keys therein.

14. A light guiding assembly, comprising:
    a first light guiding plate;
    a second light guiding plate, the second light guiding plate and the first light guiding plate being substantially coplanar with each other and defining a space therebetween; and
    a shielding plate embedded in the space between the first light guiding plate and the second light guiding plate so as to prevent light guided by the first light guiding plate and light guided by the second light guiding plate from mixing together.

15. The light guiding assembly as claimed in claim 14, wherein the shielding plate, the first light guiding plate, and the second light guiding plate are integrally formed together.

16. The light guiding assembly as claimed in claim 15, wherein the shielding plate, the first light guiding plate, and the second light guiding plate are integrally molded together.

17. The light guiding assembly as claimed in claim 15, wherein the shielding plate, the first light guiding plate, and the second light guiding plate are integrally adhered together.

18. The light guiding assembly as claimed in claim 14, wherein the first light guiding plate and the second light guiding plate are made of one or more thermoplastic resins selected from a group consisting of polyvinyl chloride, polycarbonate and polystyrene.

19. The light guiding assembly as claimed in claim 14,wherein the first light guiding plate defines a notch therethrough, the shape of the shielding plate corresponds to the shape of the notch and is received in the notch.

20. The light guiding assembly as claimed in claim 19, wherein the shielding plate defines an opening at a central area thereof, the second light guiding plate has the same shape and size as the opening and is accommodated and fixed in the opening such that shielding plate is positioned between the first light guiding plate and the second light guiding plate.

\* \* \* \* \*